United States Patent [19]

Hafner

[11] 4,051,219

[45] Sept. 27, 1977

[54] METHOD OF PREPARING FLUORINE-FREE RARE EARTH METAL COMPOUNDS FROM SUCH COMPOUNDS CONTAINING FLUORINE

[75] Inventor: Leo Hafner, Althofen, Austria

[73] Assignee: Treibacher Chemische Werke Aktiengesellschaft, Treibach, Austria

[21] Appl. No.: 707,382

[22] Filed: July 21, 1976

[30] Foreign Application Priority Data

July 25, 1975 Austria .................................. 5802/75

[51] Int. Cl.² ............................................ C01F 17/00
[52] U.S. Cl. ................................ 423/21; 75/101 BE; 260/429.2; 423/263; 423/489
[58] Field of Search ........................ 423/21, 263, 489

[56] References Cited

U.S. PATENT DOCUMENTS

| | | | |
|---|---|---|---|
| 1,314,571 | 9/1919 | Hafner | 423/263 |
| 2,805,928 | 9/1957 | Kasey | 423/21 |
| 2,995,913 | 10/1960 | Peppard et al. | 423/21 |
| 3,353,928 | 11/1967 | Woyski et al. | 423/21 |
| 3,375,061 | 3/1968 | Healy et al. | 423/21 |
| 3,812,233 | 5/1974 | Duncan | 423/21 |
| 3,857,919 | 12/1974 | Hozen et al. | 423/21 |

*Primary Examiner*—Herbert T. Carter
*Attorney, Agent, or Firm*—Kurt Kelman

[57] ABSTRACT

A rare earth metal salt containing fluorine ions is separated from an acidic solution of the salt in the presence of an amount of boric acid sufficient to sequester the fluorine ions whereby the fluorine ions are bound in the solution and fluorine-free rare earth metal salt is recovered from the solution.

5 Claims, No Drawings

METHOD OF PREPARING FLUORINE-FREE RARE EARTH METAL COMPOUNDS FROM SUCH COMPOUNDS CONTAINING FLUORINE

The present invention relates to the recovery of rare earth metal compounds from acidic solutions thereof.

Ores, particularly cerium-containing ores, used in the production of rare earth compounds frequently contain, in addition to the usual rare earth minerals, considerable amounts of fluorine. This holds true particularly for bastnasite which is a basic fluorine carbonate of a mixture of rare earth metals.

The complete removal of fluorine from fluorine-containing rare earth metal compounds according to conventional methods, such as the treatment of the compounds with caustic to form soluble sodium fluoride or the extended calcining in a moist atmosphere, has been complicated, time-consuming and expensive.

It is the primary object of this invention to provide a simple method of recovering fluorine-free rare earth metal compounds from such compounds containing fluorine.

It is known to recover pure cerium compounds from a mixed salt of rare earth metals, the easiest way of separating cerium from the other rare earth metals being in its tetravalent form by hydrolysis or extraction of ceric nitrate with organic extracting agents, such as tributyl phosphate.

In accordance with the invention, a rare earth metal salt containing fluorine ions is separated from an acidic solution of the salt in a generally conventional manner but in the presence of an amount of boric acid sufficient to sequester the fluorine ions whereby the fluorine ions are bound in the solution and fluorine-free rare earth metal salt is separated from the solution. Such a process is much simpler than the known methods of obtaining pure and fluorine-free rare earth metal compounds, particularly pure cerium compounds.

In sequestering fluorine ions in salt solutions in the presence of boric acid according to the equation $$4 HF + H_3BO_3 = 3 H_2O + HBF_4$$

stable boron fluorine ions are formed which are readily soluble in an aqueous solution. It is, therefore, readily possible to recover from fluorine-containing acidic solutions of ceric, cerous and other rare earth metal ions, in the presence of boric acid, corresponding rare earth metal oxalates free of fluorine. It is equally possible, in the presence of boric acid, to recover ceric nitrate completely free of fluorine from a strong nitric acid solution of rare earth metal salts containing fluorine and cerium in the form of ceric nitrate by extraction with an organic extracting agent, such as tributyl phosphate. In the process of the invention, the recovery of cerium oxide is unexpectedly considerably improved.

The following examples will further illustrate the practice of the invention.

EXAMPLE 1

A 7.5 N $HNO_3$ solution of ceric nitrate, containing 225 g of rare earth metal oxides per liter with 85.2%, by weight, of $CeO_2$ and 28 g of fluorine, was extracted in a conventional manner with tributyl phosphate. All the trivalent cerium was then extracted from the organic phase with hydrogen peroxide and 6 N HCl after removal of the aqueous solution therefrom and washing with 5 N $HNO_3$. The entire cerium content was then precipitated from the hydrochloric acid solution of trivalent cerium ions with oxalic acid in the form of cerium oxalate. After the cerium oxalate was calcined, a product containing more than 99.9% $CeO_2$, based on the entire rare earth metal oxide content, was obtained which, however, contained 2.7%, by weight, of fluorine. The recovery of pure cerium oxide was 60%, based on the starting product, which was unsatisfactory.

This conventional procedure was changed in accordance with the present invention by adding to the starting nitric acid solution 15 g boric acid per liter of solution before extraction with tributyl phosphate. In extracting the ceric nitrate from the organic phase, 25 g/l of boric acid was added to the hydrochloric acid. The subsequent precipitation of cerium oxalate, filtering and calcining to obtain ceric oxide was continued in the indicated conventional manner but, in this case, the resultant oxide was free of fluorine. Based on the starting product, the yield of pure cerium oxide was above 92%.

EXAMPLE 2

Two liters of a 5.2 N hydrochloric or nitric acid solution of rare earth metal salts containing, per liter, 48 g of rare earth metal oxides with a 6.2% cerium oxide content and 7.3 g of fluorine ions, were mixed with 30 g of boric acid. The pH was adjusted to 0.5 N of free acid by the addition of caustic. This rare earth metal salt solution was introduced, under agitation, in a thin stream into 2.5 liters of an aqueous oxalic acid solution containing 60 g $H_2C_2O_4.2H_2O/l$. After filtering and washing the precipitated rare earth metal oxalates, they were found to be entirely free of fluorine.

What is claimed is:

1. A method of producing a fluorine-free rare earth metal compound from a rare earth metal salt containing fluorine, the rare earth metal including cerium, comprising the steps of preparing an acidic solution of the salt in the presence of an amount of boric acid sufficient to sequester the fluorine ions in the salt, the amount of boric acid being determined by the equation $$4 HF + H_3BO_3 = 3 H_2O + HBF_4,$$

whereby the fluorine ions are bound in the solution, and separating the fluorine-free earth metal salt from the solution.

2. The method of claim 1, wherein the salt contains ceric nitrate and the boric acid is added to the acidic solution before the ceric nitrate is separated from the solution by extraction with an organic extracting agent, and after the extraction the ceric nitrate and the other rare earth salts are recovered.

3. The method of claim 2, wherein the organic extracting agent is tributyl phosphate.

4. The method of claim 1, wherein the solution is a nitric or hydrochloric acid solution.

5. The method of claim 1, wherein the fluorine-free earth metal salt is separated by precipitation with oxalic acid.

* * * * *